United States Patent
Stierle et al.

(10) Patent No.: US 7,599,046 B2
(45) Date of Patent: Oct. 6, 2009

(54) METHOD FOR DETERMINATION OF A DISTANCE AND DISTANCE MEASURING DEVICE WITH IMPROVEMENT OF THE EFFECTIVE RESOLUTION OF AN A/D CONVERTER BY PHASE MODULATION OF THE MEASURED SIGNAL

(75) Inventors: Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 634 days.

(21) Appl. No.: 10/512,714

(22) PCT Filed: May 30, 2003

(86) PCT No.: PCT/DE03/01770

§ 371 (c)(1),
(2), (4) Date: Oct. 27, 2004

(87) PCT Pub. No.: WO2004/027452

PCT Pub. Date: Apr. 1, 2004

(65) Prior Publication Data

US 2005/0168719 A1 Aug. 4, 2005

(30) Foreign Application Priority Data

Sep. 14, 2002 (DE) ............... 102 42 777

(51) Int. Cl.
*G01C 3/08* (2006.01)
(52) U.S. Cl. .......... 356/5.1; 356/4.01; 356/5.01; 356/5.15
(58) Field of Classification Search .............. 356/5.1
See application file for complete search history.

(56) References Cited

U.S. PATENT DOCUMENTS

| 4,403,857 | A | | 9/1983 | Hoelscher |
| 4,957,362 | A | | 9/1990 | Peterson |
| 5,459,571 | A | * | 10/1995 | Dammann et al. ........ 356/482 |
| 5,534,992 | A | | 7/1996 | Takeshima et al. |
| 5,737,085 | A | | 4/1998 | Zollars et al. |
| 6,040,898 | A | * | 3/2000 | Mrosik et al. ............ 356/5.09 |
| 6,633,367 | B2 | * | 10/2003 | Gogolla .................. 356/5.15 |
| 2001/0052872 | A1 | | 12/2001 | Hahlweg |
| 2002/0070780 | A1 | * | 6/2002 | Inoue .................... 327/156 |

FOREIGN PATENT DOCUMENTS

| GB | 2 336 493 A | | 10/1999 |
| GB | 2336493 A | * | 10/1999 |
| JP | 11-352227 | | 12/1999 |

OTHER PUBLICATIONS

Reis, G.: "Darf Es Ein Bisschen Mehrsein . . . " Elektronik, Franzis Verlag GMBH, Muenchen, Germany, BD. 46, NR. 2, Jan. 21, 1997, pp. 36-38 and 40-42.

* cited by examiner

*Primary Examiner*—Thomas H Tarcza
*Assistant Examiner*—Timothy A Brainard
(74) *Attorney, Agent, or Firm*—Michael J. Striker (57) ABSTRACT

A distance measuring device and a method for determination of a distance uses an optical signal, with which an analog evaluation signal (36), with phase information, is digitized in an analog-to-digital converter (44), and the phase information is then evaluated in an arithmetic unit. The evaluation signal (36) reaches the analog-to-digital converter (44) in phase-modulated form.

22 Claims, 5 Drawing Sheets

METHOD FOR DETERMINATION OF A DISTANCE AND DISTANCE MEASURING DEVICE WITH IMPROVEMENT OF THE EFFECTIVE RESOLUTION OF AN A/D CONVERTER BY PHASE MODULATION OF THE MEASURED SIGNAL

CROSS-REFERENCE

The invention described and claimed hereinbelow is also described in PCT/DE 03/01770, filed on May 30, 2003 and DE 102 44 777.1, filed Sep. 14, 2002. This German Patent Application, whose subject matter is incorporated here by reference, provides the basis for a claim of priority of invention under 35 U.S.C. 119 (a)-(d).

BACKGROUND OF THE INVENTION

The present invention is directed to a method for determination of a distance, and a distance measuring device.

A method for determining a distance and a distance measuring device are made known in DE 198 11 550 C2, with which a distance is measured with the aid of an optical signal, whereby an analog evaluation signal, with phase information, is evaluated to determine the distance.

SUMMARY OF THE INVENTION

The present invention is directed to a method for determination of a distance using an optical signal, with which an analog evaluation signal, with phase information, is digitized in an analog-to-digital converter, and the phase information is then evaluated in an arithmetic unit. It is proposed that the evaluation signal reach the analog-digital converter in phase-modulated form.

With the present invention, the quantization error of the analog-to-digital converter can be kept to a minimum. In comparison with known methods and distance measuring devices, the phase resolution can be improved given the same quality of the evaluation signal, or the measurement time can be reduced given the same phase resolution.

The present invention hereby assumes that the analog-to-digital converter, in which the analog evaluation signal is digitized, digitizes the evaluation signal with a predetermined resolution. The resolution is characterized by the particular voltage increase—referred to below as the "digitization quantum"—that the analog-to-digital converter triggers to switch from one digital output value to the next one. When a voltage fluctuation of the evaluation signal is sampled at a plurality of points separated by time, the analog-to-digital converter forwards a digital value to an arithmetic unit for each sampling point. Using these values, the arithmetic unit can calculate the phase position of an evaluation signal which has these values if the form of the evaluation signal, e.g., a sine curve, is specified.

To increase the evaluation accuracy, it can be practical for the analog-to-digital converter to periodically sample the periodic evaluation signal and, in fact, preferably in a manner such that the sampling frequency of the analog-to-digital converter corresponds to a multiple of the period of the evaluation signal. Every period of the evaluation signal is therefore sampled a few times, e.g., four times, that is, at four points. A value multiple output by an analog-to-digital converter is then associated with each period; four values in the case of four sampling points, therefore, based on which the phase position of an evaluation signal comprising these values is determinable. This is explained in FIG. 3, for example.

Figure 4:
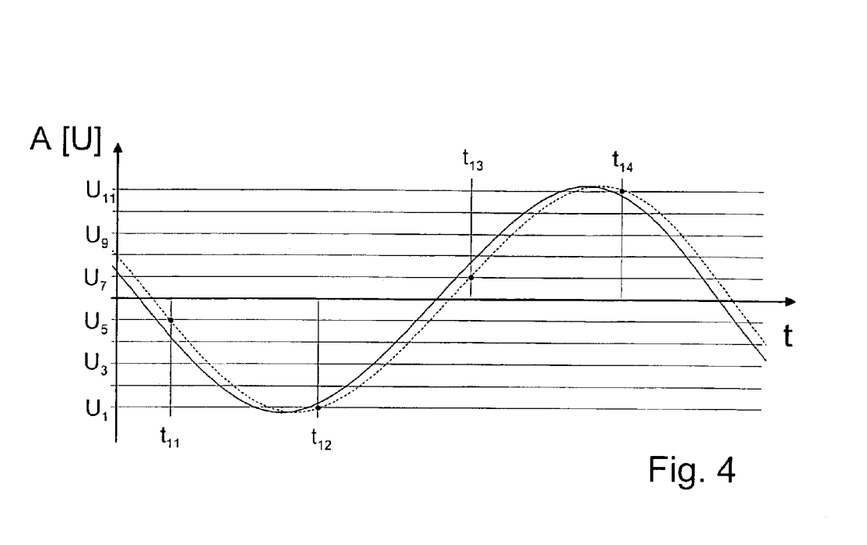
FIG. 4 shows an evaluation signal with a phase shift.

With an evaluation signal that has no noise or only a little noise, it is possible to shift the actual phase position of the evaluation signal slightly in one direction or the other without this shift triggering the analog-to-digital converter to change the output digital values. This is illustrated in FIG. 4, for example. When the phase of the evaluation signal is shifted in one direction, the analog-to-digital converter reacts after a certain displacement by changing one of the output values. If the phase is shifted further in the direction, the analog-to-digital converter reacts, only after a certain further displacement, by changing one of the output values again, etc. A maximum displacement of the phase of the evaluation signal which does not result in a change to the values output by the analog-to-digital converter is referred to below as the phase resolution quantum. Its magnitude determines the resolution of the measurement of the phase of the evaluation signal.

By performing phase modulation of the evaluation signal, i.e., moving the phase of the evaluation signal back and forth, the analog-to-digital converter does not always output identical value multiples for each period when the evaluation signal is sampled over a large number of periods. By averaging the particular corresponding output values over all value multiples, it is possible for the phase position to be determined with greater accuracy than is possible by the quantization of the analog-to-digital converter when evaluating only one value multiple.

A similar effect as that obtained with phase modulation can be obtained via noise on the output signal. If the noise is so strong that different value multiples are obtained when the evaluation signal is sampled over a plurality of periods, the phase position can be determined with increasing accuracy using averaging as sampling becomes increasingly longer. The advantage of phase modulation over noise is that the phase shift can be specifically controlled, whereas noise cannot. In this case, phase modulation can be controlled such that calculating a mean over just a relatively few periods of the evaluation signal results in a sufficiently exact result for phase determination. In this manner, a sufficiently exact determination of the phase position and, therefore, the distance, can be determined over a short measurement period.

Advantageously, an analog measuring signal having a measuring frequency is generated, and the measuring signal is converted to the evaluation signal, whereby the phase modulation of the evaluation signal is obtained by modulating the measuring signal. The modulation can be frequency modulation or phase modulation. This makes it possible to measure the distance using the measuring signal, whereby the measuring frequency can be different from the evaluation frequency of the evaluation signal. It can be advantageous to perform measurements with a very high frequency, for example, and thereby obtain a very high distance resolution. At the same time, the phase information can be determined on a substantially lower-frequency evaluation signal, which keeps the costs for the evaluation circuits low.

Advantageously, the phase of the evaluation signal undergoes regular and symmetrical fluctuations around a middle phase position. With phase modulation of this type, the averaging of values from just a few value multiples can produce an exact mean very quickly; this enables a sufficiently exact determination of the phase position of the evaluation signal. In this case, "regular" is understood to be regularity with regard for time. The fluctuation, i.e., back and forth movement along a time axis, therefore travels regularly and periodically from one extreme to the other extreme, and back. The phase of the evaluation signal also moves in a symmetrical manner. The extremes on both sides of a time and phase angle axis are therefore equidistant from the middle phase position.

The fluctuation itself can take place in a continuous manner, e.g., in the form of a sine-wave modulation, or it can jump discontinuously in the form of square-wave modulation, or it can take on other forms which appear suitable to one skilled in the art.

The phase modulation can be obtained particularly easily using frequency modulation. The frequency of the measuring signal or, directly, the frequency of the evaluation signal can be evaluated. The frequency should be modulated such that the evaluation signal reaches the analog-to-digital converter in a phase-modulated form.

Advantageously, the frequency of the measuring signal undergoes regular and symmetrical fluctuations around a middle frequency. As described above with regard for the fluctuations of the phase, a regular and symmetrical fluctuation of the frequency also allows a mean result of the value multiple of the analog-to-digital converter to be obtained, the result representing the phase of the evaluation signal with a high degree of accuracy.

Simple control of the frequency modulation can be obtained when frequency modulation is carried out by inputting a modulation signal in a VCO circuit. The VCO circuit includes a voltage controlled oscillator, which outputs a specified frequency depending on the input voltage which is input to it. If a constant voltage is input to the VCO circuit as the input signal, the VCO circuit outputs an essentially constant frequency. Via modulation of the input signal or inputting an additional modulation signal to the VCO circuit, a desired frequency modulation can be obtained in a simple manner.

A reliable, exact determination of the phase position of the evaluation signal can be obtained by matching the phase modulation of the evaluation signal to the analog-to-digital converter and shifting the phase of the evaluation signal via phase modulation on both sides around a middle phase position by at least one-fourth, and in particular by at least one-half of the largest phase resolution quantum. The magnitude of the phase resolution quanta depends on the size of the digitization quantum of the analog-to-digital converter, that is, its resolution, and on the shape and amplitude of the evaluation signal. The phase resolution quanta of a period, which are described in greater detail in FIGS. 5 and 6, need not be of equal magnitude. It is entirely possible that, with a continuous shift of the phase position of the evaluation signal, the values in a value multiple of the analog-to-digital converter do not change regularly, so there is a largest and a smallest phase resolution quantum in each period. The magnitude the phase modulation must have to obtain a reliable, exact determination of the phase position also depends, among other things, on the noise associated with the evaluation signal. If the noise is great, phase modulation is not required to reliably obtain an exact result. A long measurement time is required, however. If there is no noise, a reliable, exact determination of the phase position is attainable if the phase of the evaluation signal is shifted on both sides of a middle phase position by at least one-half of the largest phase resolution quantum of the analog-to-digital converter. The ranges in which the phase position can be determined exactly then overlap, as explained in greater detail in FIG. 9. With moderate noise, a reliable determination of the phase position is possible even with a phase modulation which is one-fourth the size of the largest phase resolution quantum, in a short measurement time.

A particularly simple determination of the means of the values in the value multiples can be obtained when the evaluation signal has an evaluation frequency which is a whole-number multiple of the modulation frequency. A modulation period, i.e., a back and forth motion of the phase along the time or phase angle axis, then covers exactly a few periods of the evaluation signal. The mean can then be calculated using the value multiples of the periods without resulting in fragments of periods of the evaluation signal and, therefore, fragments of value multiples.

Advantageously, the evaluation signal can have an evaluation frequency, whereby the modulation frequency is smaller than the evaluation frequency by a factor of at least 3. With a distance such as this between the frequencies, they are easy to separate in the evaluation using filtering.

With regard for the device, the present invention is directed to a distance measuring device, in particular a laser distance measuring device, with a device for generating an analog evaluation signal, with phase information, an analog-to-digital converter for digitizing the evaluation signal, and an arithmetic unit for evaluating the phase information. It is proposed that the distance measuring device include a modulation unit for phase modulation of the evaluation signal. As described above, an exact determination of the phase position of the evaluation signal is possible in this manner in a short measurement time.

Advantageously, the distance measuring device includes an oscillator for generating a basic signal of a basic frequency, whereby the modulation unit is provided for modulating the basic frequency with the aid of a VCO circuit. In this manner, modulation of a high frequency can be obtained in a simple and economical manner.

Simple control of the frequency modulation can be obtained by providing the modulation unit for voltage modulation of the input signal for the VCO circuit.

BRIEF DESCRIPTION OF THE DRAWINGS

Further advantages result from the following drawing description. An exemplary embodiment of the present invention is shown in the drawing. The drawing, description, and claims contain numerous features in combination. One skilled in the art will also advantageously consider them individually and combine them to form further reasonable combinations.

DETAILED DESCRIPTION OF THE EXEMPLARY EMBODIMENTS

Figure 1:
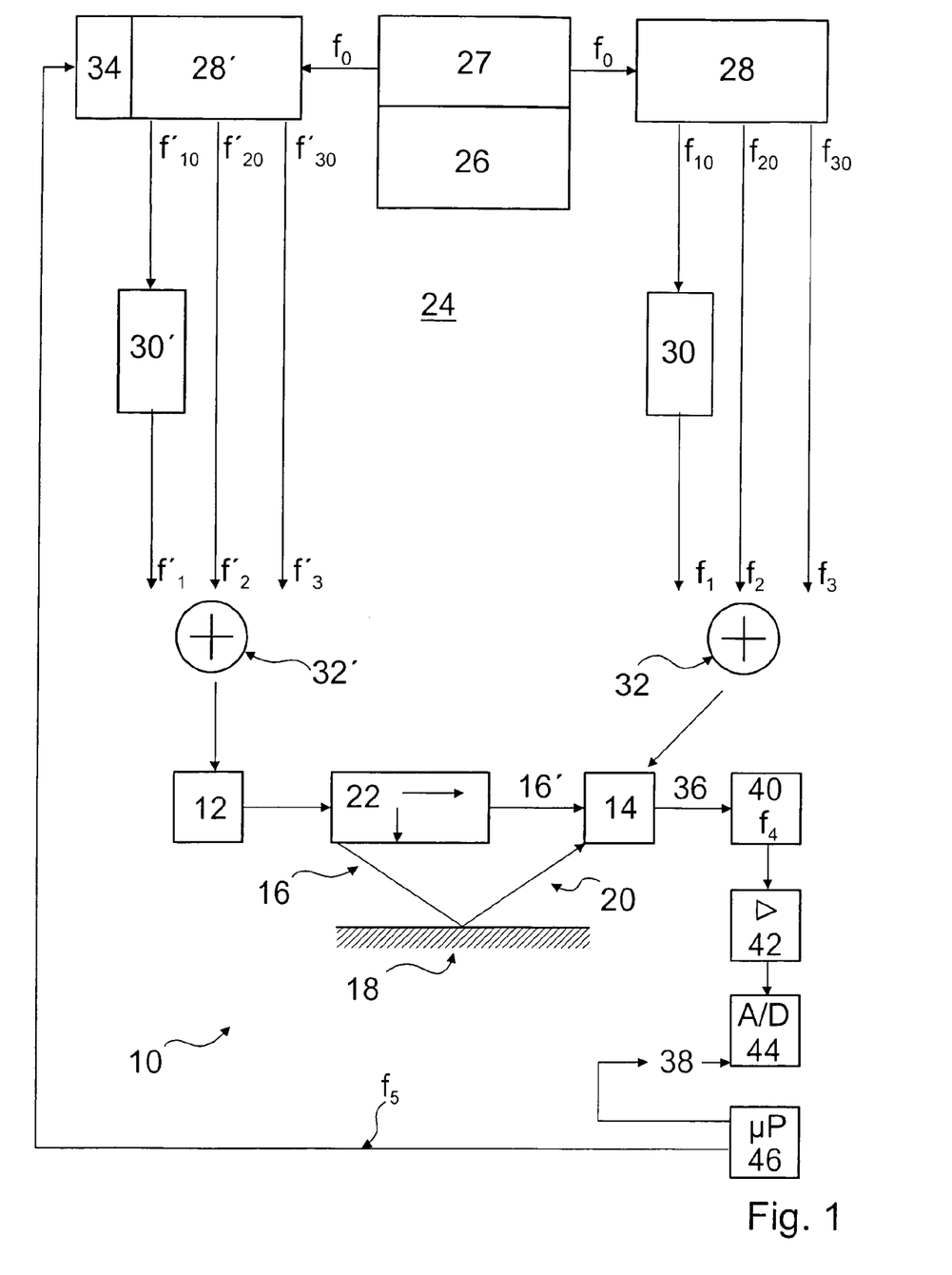
FIG. 1 shows a schematic illustration of the circuit of a distance measuring device.

FIG. 1 shows a schematic illustration of a distance measuring device labeled with the numeral 10. It includes an optical transmitter 12, e.g., a laser diode, and an optical receiver 14, which is configured as a known avalance photo-diode and enables the mixing of multiple frequencies. Using optical transmitter 12, a collimated, visible, continuous-wave laser beam is generated as transmitted signal 15 which is visible on an object 18, referred to also below as the target. Transmitted signal 16 is reflected by object 18 according to optical laws and is received as received signal 20 by optical receiver 14. Transmitted signal 16 is forwarded as reference signal 16' to optical receiver 14 immediately after the target measurement via an optical switch 22, e.g., a movable flap.

A circuit arrangement 24 is provided for controlling distance measuring device 10. The circuit arrangement includes an oscillator 26, which is designed as a quartz oscillator with a modulation device 27. Oscillator 26 provides a basic frequency $f_0$, from which all frequencies explained in greater detail below for operating distance measuring device 10 are derived. Modulation device 27 modulates basic frequency $f_0$ such that the measuring frequency being output by modulation device 27 fluctuates symmetrically and regularly around basic frequency $f_0$.

To increase the range of unambiguousness of the distance measurement with distance measuring device 10, the device is operated with a total of three modulation frequencies for transmitted signal 16. Transmitted signal 16 is amplitude-modulated in a known manner. Consequently, the received signal is also amplitude-modulated in a known manner. Due to the fact that optical switch 22 is switched over at a known point in time, it can be determined unequivocally based on the time sequence whether the current optical received signal originated directly from optical switch 22 or object 18.

A first switchable frequency divider 28, which is provided for generating mixed signals, is associated with oscillator 26. Frequency divider 28 selectively divides frequency $f_0$ provided by oscillator 26 into a frequency $f_{10}$, a frequency $f_{20}$, and a frequency $f_{30}$. A circuit device 30 is connected downstream of frequency divider 28; out of the measuring signal with frequency $f_{10}$, the circuit device generates a measuring measured signal with a measuring frequency $f_1$ which is higher than basic frequency $f_0$. Circuit device 30 includes a PLL circuit and a VCO circuit, which are not shown in greater detail in FIG. 1. The signal with measuring frequency $f_1$ and the other two signals with measuring frequencies $f_2$ and $f_3$ being output by frequency divider 28 are sent as a mixed signal to optical receiver 14 via a summing element 32. Measuring frequency $f_2$ corresponds to frequency $f_{20}$ being output by frequency divider 28, and measuring frequency $f_3$ corresponds to frequency $f_{30}$.

A second signal string is associated with oscillator 26, the signal string being provided to generate transmitted signal 16. This second signal string essentially corresponds to the signal string described above, which is provided for generating mixed signals which are sent directly to the receiver. Identical components are labeled with identical reference numerals and reference numerals with hash marks. Frequency divider 28 includes a digital phase-shifting element 34. Signals with frequencies $f'_{10}$, $f'_{20}$ and $f'_{30}$ can be applied at the outputs of frequency divider 28'. The phase of these frequencies is forwarded by phase-shifting element 34 with a frequency $f_5$. This results in a mixture of multiple frequency lines in the frequency spectrum.

Optical receiver 14 is acted upon in chronological succession, simultaneously in each case, by the mixed signals with the frequencies without hash marks, target signals 20 and reference signals 16' with the frequencies having hash marks. As a result, a transformation to an evaluation signal 36 takes place in known fashion via mixing. This evaluation signal 36 contains the necessary basic information, namely the phase angle of target signal 20 relative to an A/D converter pulse 38, followed chronologically by the phase angle of reference signal 16' relative to A/D converter pulse 38. By calculating the difference between the two phase angles per measuring frequency, the reference variable is canceled out, since it is unchanged in all successive measurements. The result is one phase angle per measuring frequency pair $f'_1$-$f_1$, $f'_2$-$f_2$ and $f'_3$-$f_3$, that is, a total of three phase angles. The smallest frequency of measuring frequencies $f_1$, $f_2$ and $f_3$ determines the range of unambiguousness of the entire distance measurement. The largest frequency of measuring frequencies $f_1$, $f_2$ and $f_3$ determines the maximum possible measurement accuracy at a given measurement time.

Frequency $f_3$ is selected relatively small, so that a slow A/D converter can be used. Evaluation signal 36 is guided through an anti-aliasing filter 40, which is a band pass filter for evaluation signal 36 of frequency $f_4$ and, from here, it is directed into an amplifier 42 on an analog-to-digital converter 44. Converted evaluation signal 36 is forwarded to a microprocessor 46 which includes appropriate arithmetic units, memory units, counters, etc. for determining the distance of object 18 from distance measuring device 10. A/D converter pulse 38 is provided simultaneously via microprocessor 46 for controlling analog-to-digital converter 44. Furthermore, a signal (trigger signal)—which exists in an at least partially fixed ratio to A/D converter pulse 38—of microprocessor 46 with frequency $f_5$ is utilized to shift frequencies $f_{10}$, $f_{20}$ and $f_{30}$ to frequencies $f'_{10}$, $f'_{20}$ and $f'_{30}$.

In the exemplary embodiment it is assumed that oscillator 26 generates a basic signal with basic frequency $f_0$=60 MHz. Frequency divider 28 divides basic frequency $f_0$ into frequencies $f_{10}$=30 MHz, $f_{20}$=15 MHz, and $f_{30}$=1.875 MHz. The signal with frequency $f_{10}$ is increased in circuit device 30 to measuring frequency $f_1$=900 MHz. The second frequency divider 28' associated with oscillator 26 divides basic frequency $f_0$ of 60 MHz, in a manner analogous to frequency divider 28, into signals with frequencies $f'_{10}$, $f'_{20}$ and $f'_{30}$, whereby frequencies $f'_{10}$, $f'_{20}$ and $f'_{30}$ are shifted digitally by frequency $f_4$ relative to frequencies $f_{10}$, $f_{20}$ and $f_{30}$. Frequency $f_4$ is 2.929 kHz, so that measuring frequency $f^1$ is 899.997 MHz, measuring frequency $f'_2$ is 14.997 MHz, and measuring frequency $f'_3$ is 1.872 MHz. All frequencies are generated digitally with the aid of the trigger signal of frequency $f_5$ from microprocessor 46. At frequency $f_{10}$=15 MHz, for example, trigger signal $f_5$ has exactly four-fold the frequency of $f_4$. With each pulse of the trigger signal with frequency $f_5$=11.716 kHz, the phase of the signal with frequency $f_{10}$ is shifted by 90°, so that a shift of 360° occurs with frequency $f_4$=2.929 kHz. Evaluation signal 36 with the phase information, which is formed by mixing the frequencies without hash marks with the frequencies-shifted by $f_4$—of transmitted signal 16' and/or target signal 20, therefore has the frequency $f_4$=2.929 kHz. Other frequencies are also possible in other exemplary embodiments, of course.

Figure 2:
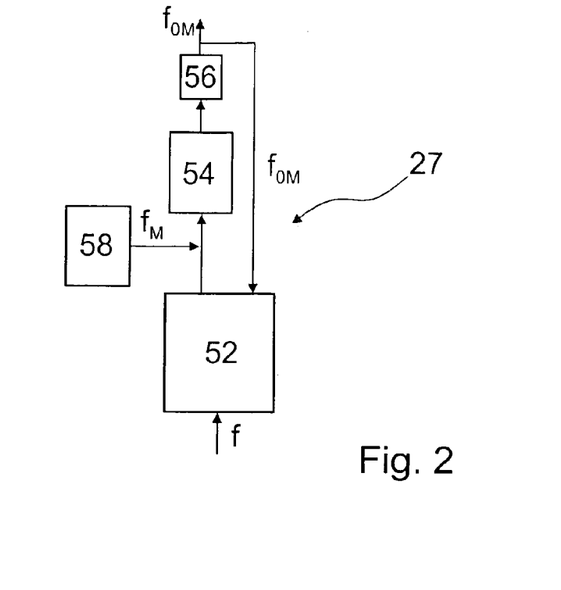
FIG. 2 shows a schematic depiction of a frequency modulation device.

FIG. 2 shows a schematic illustration of modulation device 27, which includes a PLL circuit 52 and a VCO circuit 54. VCO circuit 54 is a voltage controlled oscillator and is designed to output a signal with frequency $f_6$ or a frequency located in a range around frequency $f_0$. PLL circuit 52 is a phase lock loop. Modulation device 27 includes an LC filter 56, which has inductivity and capacitance. LC filter 56 filters out harmonics and serves to improve signal quality. The signal with frequency $f_0$ is input into PLL circuit 52. There, the phase position of this signal is compared with the phase position of the signal coming from VCO circuit 54, whereby the comparison of the phases of the two signals is converted into an output voltage of PLL circuit 52. This voltage serves as input variable for VCO circuit 54, which generates from it a signal also having frequency $f_0$.

Modulation device 27 also includes a modulation unit 58 that modulates the voltage of the input signal of VCO circuit 54 with a modulation frequency $f_M$. Modulation frequency $f_M$ is 292.9 Hz, which corresponds to 1/10 of frequency $f_4$, by which the frequencies with hash marks are shifted. By modulating the input signal of VCO circuit 54, frequency $f_{OM}$ output by VCO circuit 54 is modulated around basic frequency $f_0$. This modulated basic frequency $f_{OM}$ is sent to the two frequency dividers 28 and 28'. As a result, all signals up to optical receiver 14 are frequency-modulated in the same manner. Target signal 20 is therefore also frequency-modulated. Consequently, when the distance of object 18 from distance measuring device 10 remains the same, the phase of the target signal entering optical receiver 14 is phase-modulated. Although the frequency modulation is canceled out in optical receiver 14 by the mixing of the measuring frequencies, since evaluation signal 36 has frequency $f_4$, and not individual frequencies $f_1$, $f_2$, etc., the phase modulation is retained in evaluation signal 36 and therefore reaches analog-to-digital converter 44.

Modulation unit 58 sends a regular modulation signal with modulation frequency $f_M$ to the input signal of VCO circuit 54 such that the modulated output signal of VCO circuit 54 undergoes regular and symmetrical fluctuations around a middle frequency. As a result, the measuring and mixed frequencies also undergo regular and symmetrical fluctuations around a middle frequency. The frequency of the measuring signal with frequency $f_1$ fluctuates regularly by a predetermined amount in both directions; the frequency therefore becomes larger and smaller than $f_1$ by the same amount.

Figure 3:
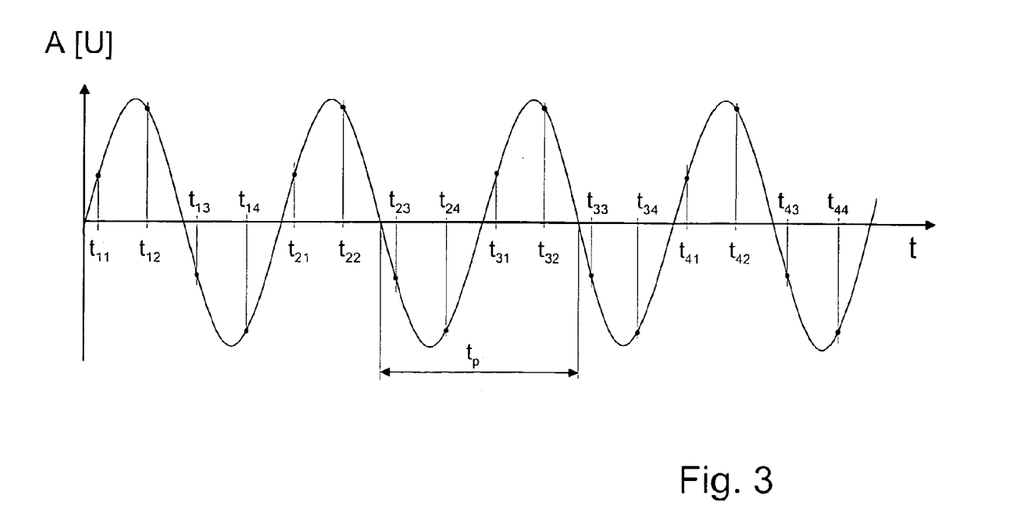
FIG. 3 shows an evaluation signal with sampling points of an analog-to-digital converter.

FIG. 3 shows the sampling of evaluation signal 36 by analog-to-digital converter 44. Evaluation signal 36 is a fluctuation of voltage U with amplitude A; for simplicity, it is shown in the diagram as a sine signal plotted over time. Evaluation signal 36 can just as easily be square-waved or have a different shape. Evaluation signal 36, which fluctuates with the evaluation frequency, has period length $t_p$. Analog-to-digital converter 44 samples evaluation signal 36 four times each per period length $t_p$. The points in time at which analog-to-digital converter 44 samples evaluation signal 36 are labeled $t_{11}$ through $t_{14}$ for the first period, $t_{21}$ through $t_{24}$ for the second period, and $t_{31}$ through $t_{34}$ for the third period, etc. The values measured by analog-to-digital converter 44 in one period, e.g., the values measured at instants $t_{11}$, $t_{12}$, $t_{13}$ and $t_{14}$, are referred to as value multiples of this period. With an evaluation signal 36 which remains the same over the periods shown, the values of the value multiple measured by analog-to-digital converter 44 and corresponding with each other, e.g., $t_{11}$, $t_{21}$ and $t_{31}$, are the same. If the values measured over a plurality of periods are averaged, the measured results therefore do not change.

If the shape of evaluation signal 36 is known, the theoretical phase position of evaluation signal 36 is capable of being calculated by analog-to-digital converter 44 based on the values in a value multiple.

FIG. 4 shows evaluation signal 36 extending over slightly more than one period $t_p$, as a solid line. Time t is plotted on the horizontal axis, with instants $t_1$ through $t_4$, at which analog-to-digital converter 44 samples evaluation signal 36. Amplitude A in voltage U is plotted on the vertical axis, whereby the axis is divided into voltage values $U_1$ through $U_{11}$ of analog-to-digital converter 44; for transparency, only every other value is labeled in FIG. 4. When evaluation signal 36 is sampled, analog-to-digital converter 44 determines voltage value $U_5$ at measurement instant $t_{11}$, voltage value $U_1$ at measurement instant $t_{12}$, voltage value $U_7$ at measurement instant $t_{13}$, and voltage value $U_{11}$ at measurement instant $t_{14}$. If the phase of evaluation signal 36 shifts to the right, for example, this does not immediately result in a change to the value multiple ($U_5$, $U_1$, $U_7$, $U_{11}$). Only when the phase reaches the position indicated with a dotted line do the first and third values of the value multiple change to value $U_6$ at instants $t_{11}$ and $t_{13}$, respectively. The shift of the phase from the solid-line position to before the dotted-line position is therefore undetectable by analog-to-digital converter 44.

Figure 5:
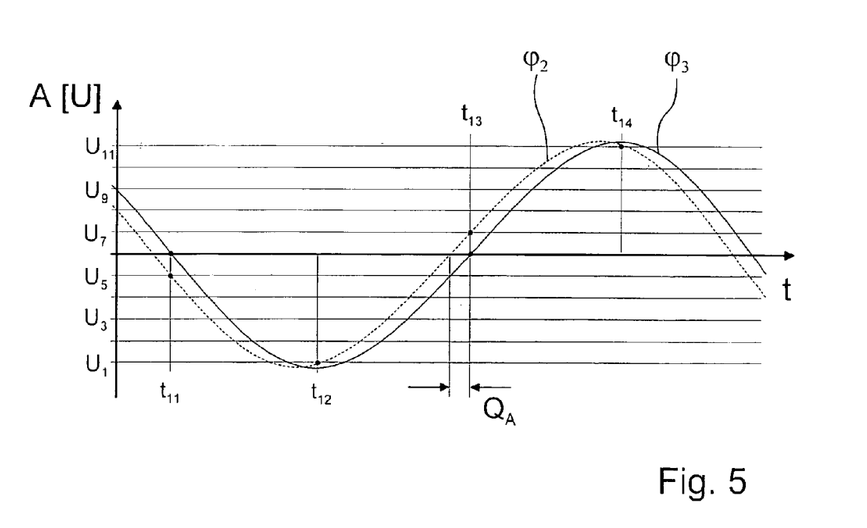
FIG. 5 shows an evaluation signal with another phase shift.

The phase resolution capacity of analog-to-digital converter 44 is explained in FIG. 5 as an example. The phase position of evaluation signal 36 shown as a dotted line corresponds to the dotted-line phase position in FIG. 4. When the phase of evaluation signal 36 shifts from left to right, the first and third values in the value multiple both jump to value $U_6$ at instants $t_{11}$ and $t_{13}$, respectively. As the phase shifts further, the value multiple does not change again until the phase reaches the solid-line position. The first and third values in the value multiple then jump from $U_6$ to $U_7$ and from $U_6$ to $U_5$ at instants $t_{11}$ and $t_{13}$, respectively. The value multiple of analog-to-digital converter 44 does not change between the positions of the phase position shown in FIG. 5. The dotted-line phase position is labeled $\phi_2$, and the solid-line phase position is labeled $\phi_3$. The distance between the shown phase positions $\phi_2$ and $\phi_3$, at which the value multiple changes when the phase is shifted, is referred to as phase resolution quantum $Q_A$. The magnitude of phase resolution quantum $Q_A$ indicates the phase resolution capability of analog-to-digital converter 44.

Analog-to-digital converter 44 is not capable of continuously resolving the phase position; instead, it can only display discrete phase positions. The discrete phase positions capable of being displayed by analog-to-digital converter 44, of which only eight are shown as examples and are labeled $\phi_1$ through $\phi_8$, are depicted in the diagram in FIG. 6 as horizontal phase levels. These phase levels are not necessarily equidistant from each other. The distance between them depends essentially on the shape of evaluation signal 36 and the number of sampling sites of analog-to-digital converter 44 per period of evaluation signal 36. If evaluation signal 36 merely fluctuates, without any noise, analog-to-digital converter 44 is capable only of determining these phase positions and no intermediate values.

To make intermediate values detectable, that is, to increase the phase resolution of analog-to-digital converter 44, it is possible to add amplitude noise to evaluation signal 36. Due to the resultant "jittering" of evaluation signal 36, when the phase position shifts, one value in the value multiple jumps to a new value even before a discrete phase level has been reached. The discrete phase levels are "smeared" somewhat as a result, which is shown using shaded phase position regions in FIG. 7 as an example for weak amplitude noise. The limits of the "smearing" are delineated sharply in FIG. 7 to enhance transparency. Strictly speaking, the "smearing" caused by noise does not have distinct limits. The noise is sufficient to make all intermediate phases between discrete phase positions $\phi_6$ and $\phi_7$ measurable. All intermediate phases between the rest of the discrete phase positions shown are not detectable, however. Stronger noise would be required to make all intermediate phases between discrete phase positions $\phi_3$ and $\phi_4$ measurable, for example. The noise would have to be even stronger to make all intermediate phases detectable between discrete phase levels $\phi_4$ and $\phi_5$, which are furthest apart. The intermediate phases could then be calculated using long measurement periods over many periods of evaluation signal 36 and averaging corresponding values in the value multiple. The same effect as is obtained above using amplitude noise can be obtained using phase noise or frequency noise.

The effect of "smearing" the discrete phase levels can be obtained using targeted phase modulation. Phase modulation can be obtained by shifting the phase or by frequency modulation, as described above, for example. The phase modulation brought about by frequency modulation as described above is shown in FIG. 8 as an example. In this case, the phase of evaluation signal 36 is moved back and forth on both sides. In the exemplary embodiment, the phase is moved back and forth on both sides and evenly around a middle phase position $\phi_m$. The maximum deflection in both directions is indicated by $P_v$ in both cases. The maximum phase position shifted to the left is labeled $\phi_l$, and the maximum phase position shifted to the right is labeled $\phi_r$. The phase modulation causes a change in the value multiple of analog-to-digital converter 44 for a period: While the measured value recorded at instant $t_{11}$ for a middle phase position $\phi_m$ is $U_5$, it is $U_4$ for the left phase position $\phi_l$, and $U_7$ for the right phase position $\phi_r$. Analogously, the third value in the value multiple changes at instant $t_{13}$ in each phase, while the values at instants $t_{12}$ and $t_{14}$ remain unchanged by phase modulation.

Figure 8:
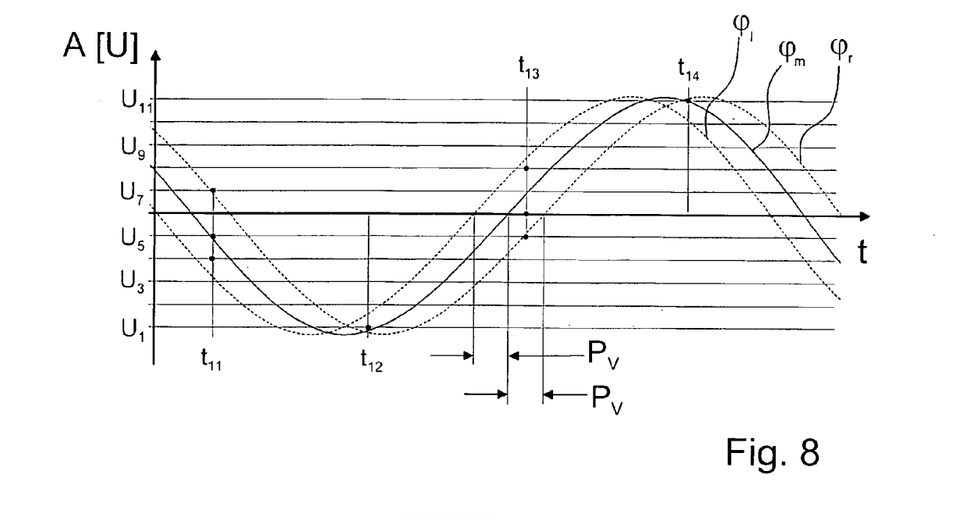
FIG. 8 shows a phase-modulated evaluation signal with modulation limits.

The mean of the three phase positions shown in FIG. 8 corresponds exactly to phase position $\phi_m$. When the three phase positions—or the phase positions between the extreme phase positions $\phi_l$ and $\phi_r$—are measured and averaged, the middle phase position $\phi_m$ is obtained. Therefore, when measuring the value multiple over a plurality of periods in which the phase has traveled back and forth at least once, the value that would correspond to phase position $\phi_m$ at a very high resolution of analog-to-digital converter 44 is calculated from the mean of the values of corresponding sampling instants, i.e., a mean of all values in the measurement at instants $t_{11}$, $t_{21}$, $t_{31}$, $t_{41}$, etc. The resolution of analog-to-digital converter 44 can therefore be "artificially" increased to the phase modulation carried out on evaluation signal 36 without the need to use a higher-resolution and, therefore, more expensive converter. In this manner, a simpler converter can be used, e.g., a 10-bit converter instead of a 12-bit converter 44. Costs can be saved as a result.

Figure 6:
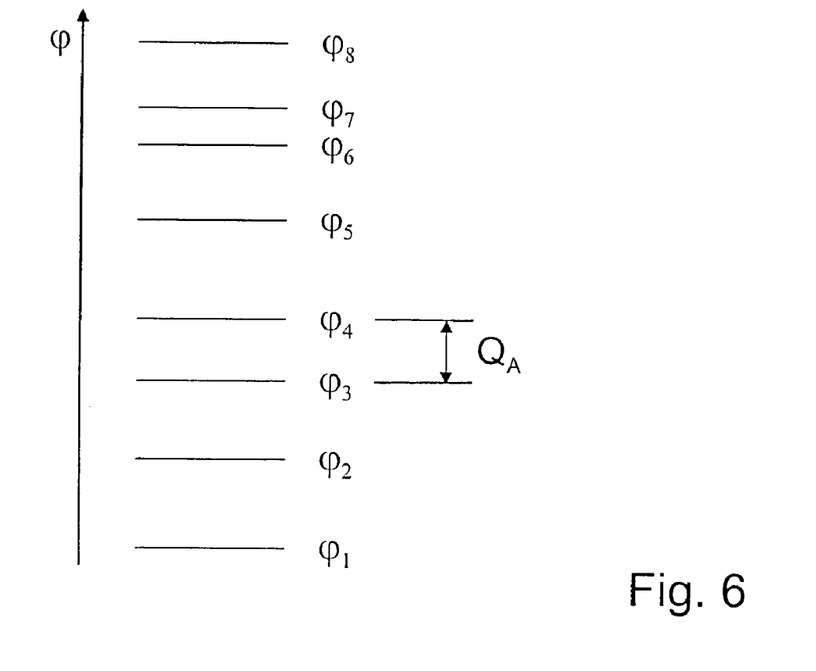
FIG. 6 shows a phase position level of a measurement procedure on an evaluation signal.
Figure 7:
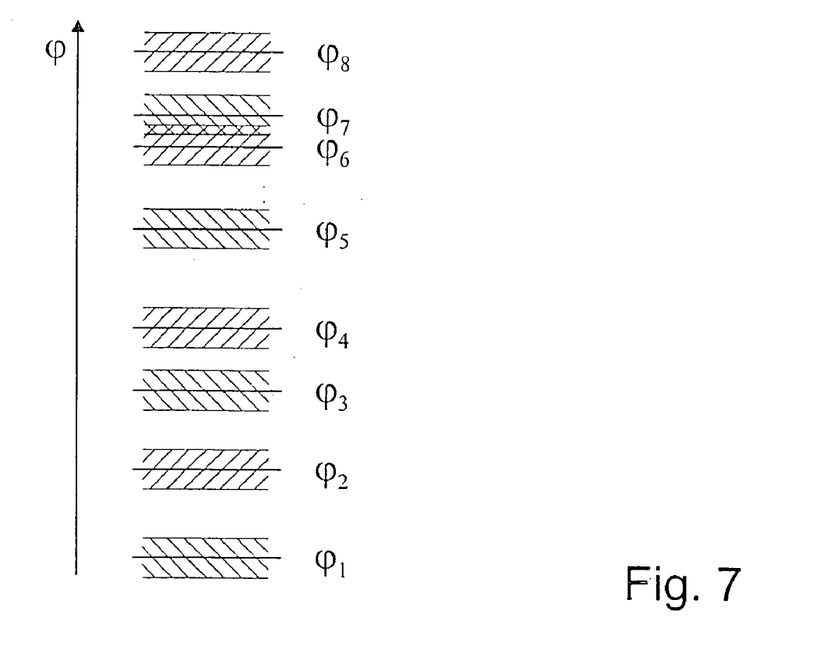
FIG. 7 shows phase levels expanded with noise.
Figure 9:
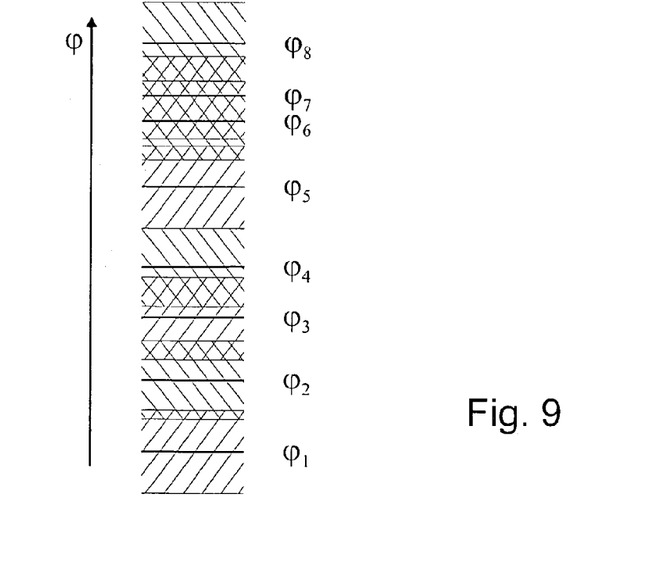
FIG. 9 shows phase position levels of a measurement procedure with phase modulation.

To enhance transparency, the two-sided shift of the phase position induced by frequency modulation and shown in FIG. 8 is greater than the largest distance between two discrete phase positions, as described in FIGS. 6 and 7. To permit measurement of all phase positions between discrete phase positions $\phi_i$, it is sufficient for the shift to amount to half of the largest phase resolution quantum. The largest phase resolution quantum is the distance between discrete phase positions $\phi_4$ and $\phi_5$, as shown in FIGS. 6, 7 and 9. FIG. 9 shows the "smearing" of discrete phase positions $\phi_i$, which is induced by frequency modulation, caused by the phase positions shifting by more than half of the largest phase resolution quantum.

Compared with "smearing" the discrete phase levels using noise, a very exact measured result of the phase position can be obtained after just a relatively short measurement period by shifting the phase of evaluation signal 36 in a targeted manner. Simply averaging evaluation signal 36—which has been modulated in a targeted manner, over a few, e.g., 10 periods, results in a very good measured result. To obtain an equivalent result with the aid of noise, the corresponding values of value multiples of analog-to-digital converter 44 would have to be averaged over a significantly larger number of periods.

It is also feasible to use a combination of noise and modulation to obtain a good measured result. In a case such as this, it is sufficient if the "combined smearing" of the discrete frequency levels obtained via modulation and noise overlaps everywhere to a sufficient extent. The phase of the evaluation signal can be shifted via phase modulation by at least one-fourth of the largest phase resolution quantum, for example, on both sides of a middle phase position, which itself results in the effect of increased phase resolution.

| Reference Numerals | |
|---|---|
| 10 | Distance measuring device |
| 12 | Optical transmitter |
| 14 | Optical receiver |
| 16 | Transmitted signal |
| 16' | Reference signal |
| 18 | Object |
| 20 | Received signal |
| 22 | Switch |
| 24 | Circuit arrangement |
| 26 | Oscillator |
| 27 | Modulation device |
| 28, 28' | Frequency divider |
| 30, 30' | Circuit device |
| 32, 32' | Summing element |
| 34 | Phase-shifting element |
| 36 | Evaluation signal |
| 38 | A/D converter pulse |
| 40 | Anti-aliasing filter |
| 42 | Amplifier |
| 44 | Analog-to-digital converter |
| 46 | Microprocessor |
| 52 | PLL circuit |
| 54 | VCO circuit |
| 56 | LC filter |
| 58 | Modulation unit |
| $f_0$ | Basic frequency |
| $f_{0M}$ | Modulated basic frequency |
| $f_M$ | Modulation frequency |
| $f_1, f_1'$ | Frequency |
| $f_2, f_2'$ | Frequency |
| $f_3, f_3'$ | Frequency |
| $f_4$ | Frequency |
| $f_5$ | Frequency |
| $f_{10}, f_{10}'$ | Frequency |
| $f_{20}, f_{20}'$ | Frequency |
| $f_{30}, f_{30}'$ | Frequency |
| $t_p$ | Period length |
| $t_i$ | Instant |
| $\phi_i$ | Phase position |
| $Q_A$ | Phase resolution quantum |
| $P_v$ | Maximum deflection |

What is claimed is:

1. A method for determination of a distance using an optical signal, comprising the steps of:

generating an optical target signal;

transmitting the target signal by an optical transmitter on a target, wherein said target signal is reflected on the target;

receiving the target signal by an optical receiver;

transforming the target signal to an analog evaluation signal, the evaluation signal having a phase information which depends on the distance to be measured;

digitizing the analog evaluation signal in an analog-to-digital converter, wherein the analog-to-digital converter has a given resolution;

evaluating the phase information of the digitized evaluation signal in an arithmetic unit, wherein phase resolution quanta of the arithmetic unit depend on the resolution of the analog-to-digital converter;

modulating the phase of the analog evaluation signal such that the analog evaluation signal reaches said analog-to-digital converter in phase-modulated form, wherein the phase modulation of the analog evaluation signal is matched to the analog-to-digital converter by shifting the phase of the evaluation signal on both sides around a middle phase position.

2. The method as recited in claim 1, further comprising the steps of generating an analog measuring signal having a measuring frequency ($f_1$, $f_2$, $f_3$), and converting the measuring signal to the evaluation signal (36), whereby the phase modulation of the evaluation signal (36) is obtained by modulating the measuring signal.

3. The method as recited in claim 1, wherein the phase of the evaluation signal (36) undergoes regular and symmetrical fluctuations around a middle phase position ($\phi_m$).

4. The method as recited in claim 1, wherein the phase modulation is obtained using frequency modulation.

5. The method as recited in claim 4, further comprising the steps of generating an analog measuring signal having a measuring frequency ($f_1$, $f_2$, $f_3$), and converting the measuring signal to the evaluation signal (36), whereby the measuring frequency ($f_1$, $f_2$, $f_3$) of the measuring signal undergoes regular and symmetrical fluctuations around a middle frequency.

6. The method as recited in claim 4, wherein the frequency modulation is carried out by entering a modulation signal in a VCO circuit (54).

7. The method as recited in claim 1, wherein by shifting of the phase of the evaluation signal the phase is shifted on both sides around a middle phase position by at least one-fourth of a largest phase resolution quantum resulting from the resolution of the analog-to-digital converter.

8. The method as recited in claim 1, wherein the phase modulation of the evaluation signal is performed with a modulation frequency and the evaluation signal has an evaluation frequency that is a whole-number multiple of the modulation frequency.

9. The method as recited in claim 1, wherein the phase modulation of the evaluation signal is performed with a modulation frequency, the evaluation signal has an evaluation frequency, and the modulation frequency is smaller than the evaluation frequency by at least a factor of 3.

10. The method as recited in claim 1, further comprising the steps of measuring values of the evaluation signal (36), which are measured by the analog-to-digital converter (44) in one period of the evaluation signal (36) at sampling instants ($t_{11}$, $t_{12}$, $t_{13}$, $t_{14}$) over a plurality of periods in which the phase of the evaluation signal (36) has traveled back and forth at least once, and calculating a mean of said values over said periods.

11. The method as recited in claim 1, further comprising the steps of:
generating an analog measuring signal having several measuring frequencies for increasing the range of unambiguousness of the distance measurement; and
sending said analog measuring signal to the optical transmitter to generate the target signal, whereby the phase modulation of the evaluation signal is obtained by modulating the measuring signal.

12. The method as recited in claim 1, wherein the resolution of the analog-to-digital converter is characterized by a digitalizing quantum, the digitalizing quantum corresponding to a gap between two successive discrete values which may be output by the analog-to-digital converter and wherein the phase resolution quanta of the arithmetic unit correspond to a gap between two successive discrete phase values which are configured to be output by the arithmetic unit and the phase resolution quanta depend on the size of the digitalization quantum of the analog-to-digital converter.

13. The method as recited in claim 12, wherein the shifting of the phase of the evaluation signal on both sides around a middle phase position effects a smearing of the phase resolution quanta, by which smearing ranges around discrete phase values are created, wherein the phase is determined continuously inside a range, and wherein the shifting of the phase of the evaluation signal is chosen so that two successive ranges overlap.

14. A distance measuring device, comprising:
an optical transmitter for transmitting a target signal on a target;
an optical receiver for receiving the target signal reflected on a target;
a device for transforming the target signal to an evaluation signal, the evaluation signal having a phase information which depends on a distance to be measured;
an analog-to-digital converter for digitizing the evaluation signal, wherein the analog-to-digital converter has a given resolution;
an arithmetic unit for evaluating the phase information, wherein phase resolution quanta of the arithmetic unit depend on the resolution of the analog-to-digital converter; and
a modulation unit for phase modulation of the evaluation signal, wherein the phase modulation of the analog evaluation signal is matched to the analog-to-digital converter by shifting the phase of the evaluation signal on both sides around a middle phase position.

15. The distance measuring device as recited in claim 14, further comprising:
an oscillator (26) for generating a basic signal of a basic frequency ($f_0$), whereby the modulation unit (58) is provided for modulating the basic frequency ($f_0$) with the aid of a VCO circuit (54).

16. The distance measuring device as recited in claim 15, wherein the modulation unit (58) is provided for voltage modulation of the input signal of the VCO circuit (54).

17. The method as recited in claim 1, whereby the phase of the target signal entering the optical receiver is modulated.

18. The method as recited in claim 17, wherein the evaluation signal (36) is obtained from the target signal (16, 20) via mixing in the optical receiver (14).

19. The method as recited in claim 17, further comprising the steps of generating an analog measuring signal having a measuring frequency ($f_1$, $f_2$, $f_3$) and sending said analog measuring signal to the optical transmitter (12) to generate the target signal (16, 20), whereby the phase modulation of the evaluation signal (36) is obtained by modulating the measuring signal.

20. The method as recited in claim 17, wherein further comprising the steps of frequency modulating the target signal (16, 20) to enter the optical receiver (14) phase modulated, wherein the evaluation signal (36) is obtained from the target signal (16, 20) via mixing in the optical receiver (14), canceling out the frequency modulation by mixing in the optical receiver (14) and retaining the phase modulation of the target signal (16, 20) in the evaluation signal (36), whereby said target signal reaches the analog-to-digital converter (14).

21. The method as recited in claim 19, wherein the phase modulation of the evaluation signal (36) is obtained by frequency modulating the measuring signal.

22. The method as recited in claim 1, wherein by shifting of the phase of the evaluation signal the phase is shifted on both sides around a middle phase position by at least one-half of a largest phase resolution quantum resulting from the resolution of the analog-to-digital converter.

* * * * *